R. A. REED.
DUMPING WAGON.
No. 188,541. Patented March 20, 1877.
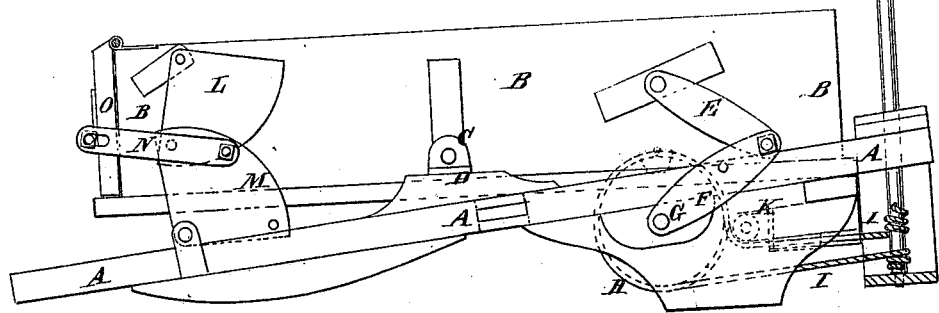
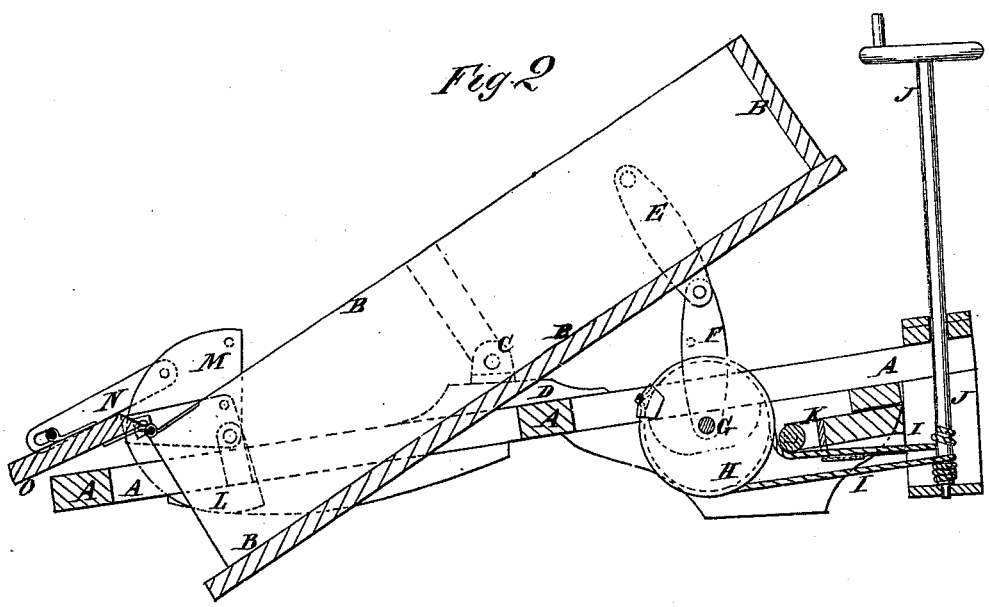
WITNESSES:
A. W. Almqvist
J. H. Scarborough
INVENTOR:
R. A. Reed
BY Munn & Co
ATTORNEYS.

UNITED STATES PATENT OFFICE.

ROBERT A. REED, OF HOBOKEN, NEW JERSEY.

IMPROVEMENT IN DUMPING-WAGONS.

Specification forming part of Letters Patent No. 188,541, dated March 20, 1877; application filed February 10, 1877.

*To all whom it may concern:*

Be it known that I, ROBERT A. REED, of Hoboken, Hudson county, and State of New Jersey, have invented a new and Improved Dumping Device for Trucks, &c., of which the following is a specification:

Figure 1 is a side view of my improved device, shown as applied to the frame and body of a truck, and in position for carrying a load. Fig. 2 is a vertical longitudinal section of the same, shown in position for dumping the load.

The object of this invention is to furnish an improved device for attachment to trucks, cars, wagons, carts, and other vehicles, to enable their loads to be readily dumped, and which shall be simple in construction and convenient in use.

The invention will first be described in connection with the drawing, and then pointed out in the claims.

In the drawing, A represents the frame of a truck, which is connected with the running-gearing in the usual way. B is the body or box, to the lower part of the sides of which, a little in the rear of the center, are attached pivots C, which work in bearings D attached to the side bars of the frame A. To the upper forward part of the sides of the body B are pivoted the upper ends of two bars, E, to the lower ends of which are pivoted the upper ends of two similar bars, F. The lower ends of the bars F are attached to the ends of a rod or shaft, G, which works in bearings attached to the side bars of the frame A, and to the middle part of which is attached a wheel, H.

To the wheel H are attached the ends of two cords or chains, I, which pass around it in opposite directions, and the other ends of which are wound in opposite directions around, and are attached to the lower end of, the upright shaft.

The shaft J works in bearings attached to the front cross-bar of the frame A, and in a bracket attached to said cross-bar, and has a hand wheel or crank attached to its upper end, for convenience in operating it.

The upper cord or chain I passes beneath a guide-roller, K, pivoted to the frame A to keep it in contact with the wheel H, so that the two cords or chains I may have about the same tautness.

By this construction, by turning the shaft J in one direction the forward end of the body or box B will be raised into the position shown in Fig. 2, to dump the load; and by turning it in the other direction, the body or box B will be drawn back into a horizontal position, as shown in Fig. 1.

To give steadiness of motion to the body or box B, two other pairs of sectors, L M, are used for connecting the rear part of the body or box B with the rear part of the frame A. The quadrantal sectors L M are pivoted at their angles, the one to the upper part of the sides of the body or box B, and the other to the side bars of the frame A. The sectors L M are pivoted to each other at their rear corners. To the lower sectors M are pivoted the ends of two bars, N, the rear ends of which have short slots formed in them to receive pivots attached to the tail-board O of the body or box B. The tail-board O is pivoted, at its upper edge, to the upper corners of the side boards of the body B, or to supports attached to said side boards. By this construction, as the body or box B is tilted the tail-board O is swung back, allowing the load to run out.

In case the rear pairs of sectors L M are not used, the bars N are extended forward, and are pivoted to the bars E F.

Having thus described my invention, I claim as new and desire to secure by Letters Patent—

1. The combination, with body B, pivoted to frame at or near the middle, of the sectors L M, connecting the rear of body and frame, as and for the purpose set forth.

2. The combination, with the hinged tail-board on a pivoted dumping-wagon, of the bars N, slotted at one end, and at the other connected with sectors L M or bars E F, as and for the purpose specified.

ROBERT A. REED.

Witnesses:
JAMES T. GRAHAM,
C. SEDGWICK.